March 2, 1965 W. PFEIFFER 3,172,037
METHOD FOR CHECKING THE CONDITION OF AN ION EXCHANGE MASS BY
SHORT INTERMITTENT APPLICATION OF DIRECT CURRENT
VOLTAGE AND CURRENT MEASUREMENT
Filed Dec. 24, 1959 10 Sheets-Sheet 1

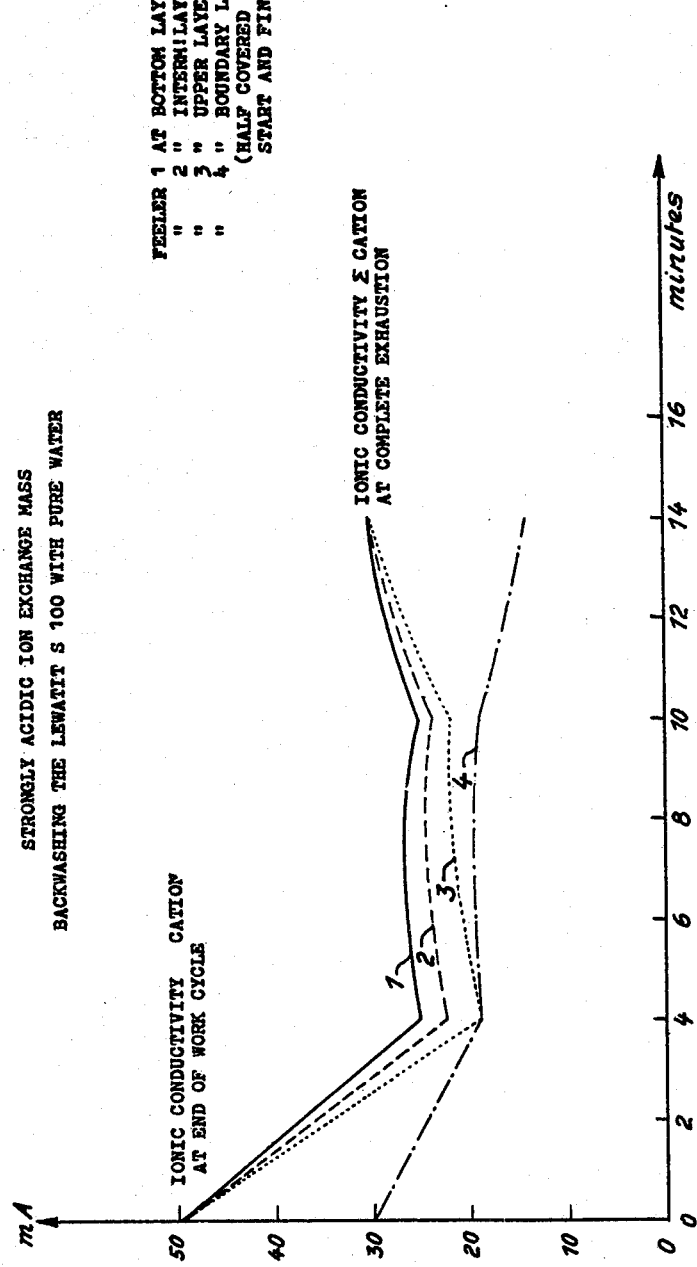

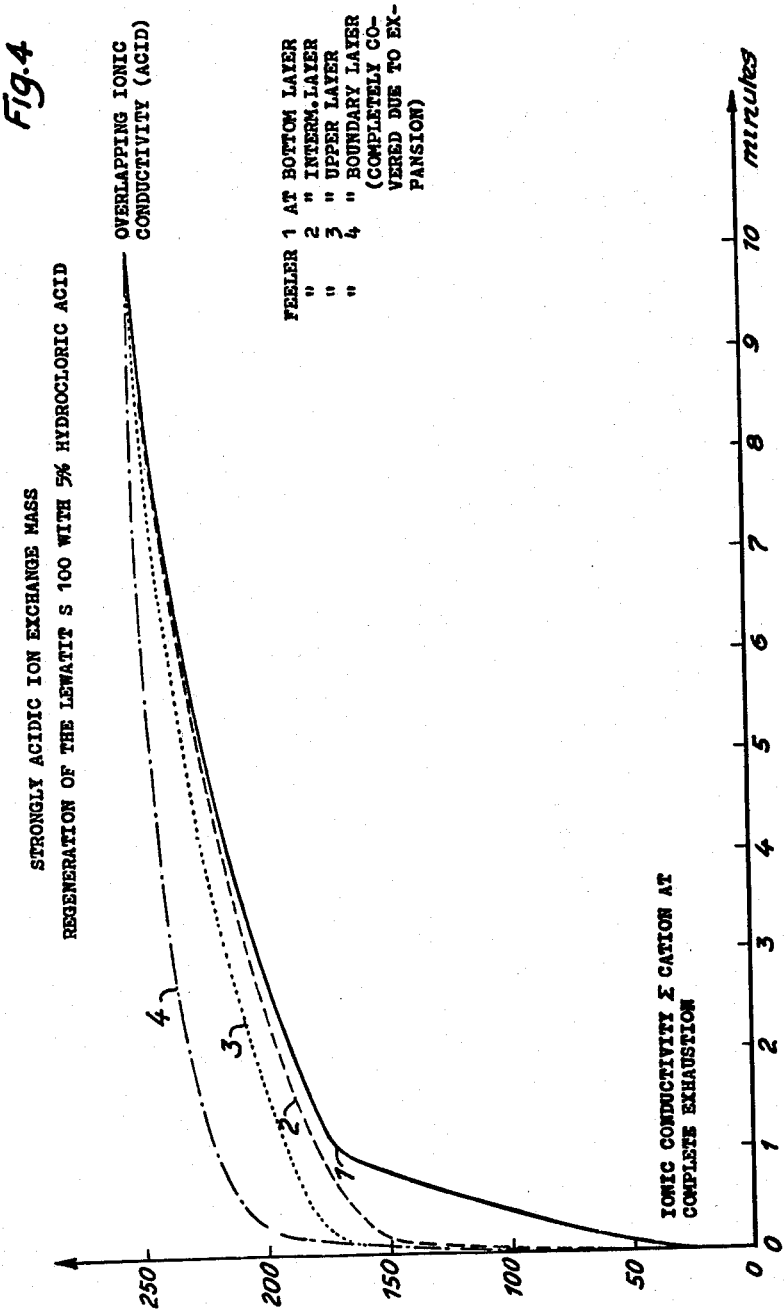

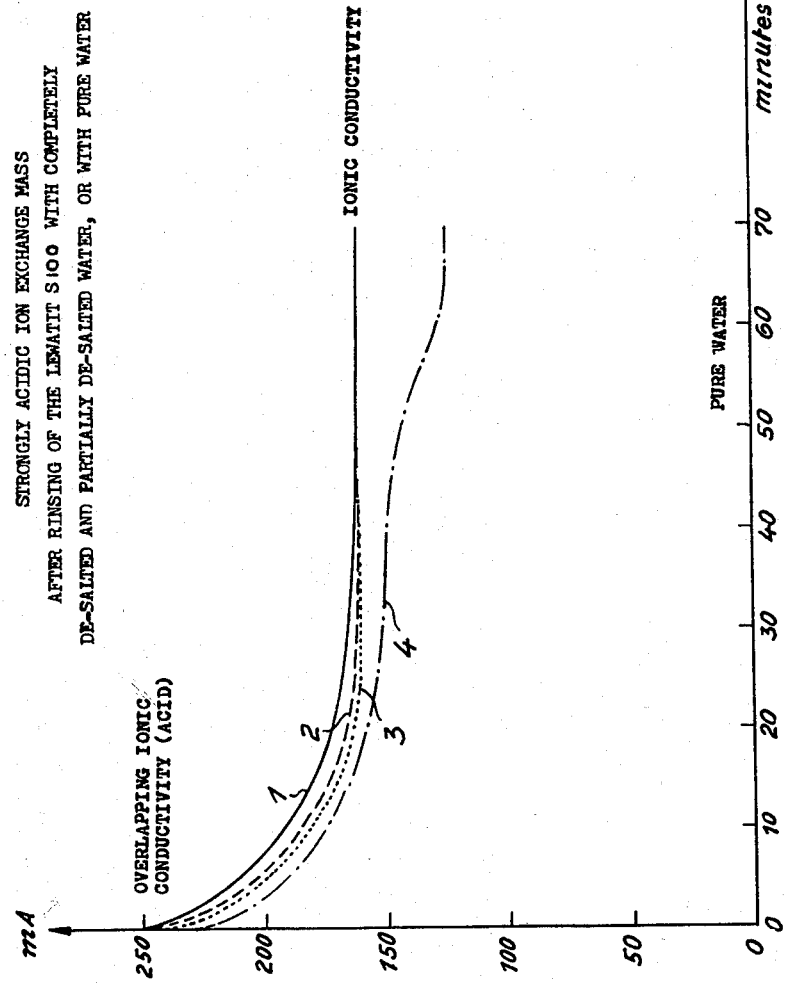

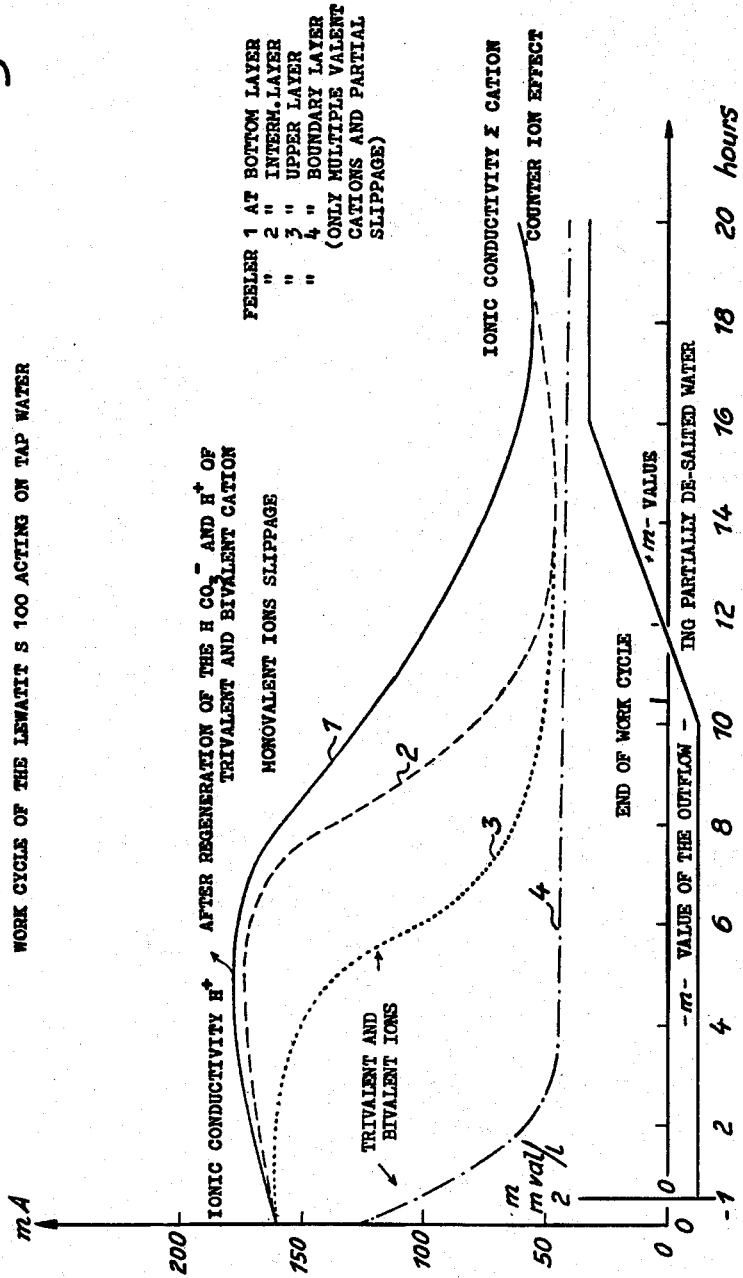

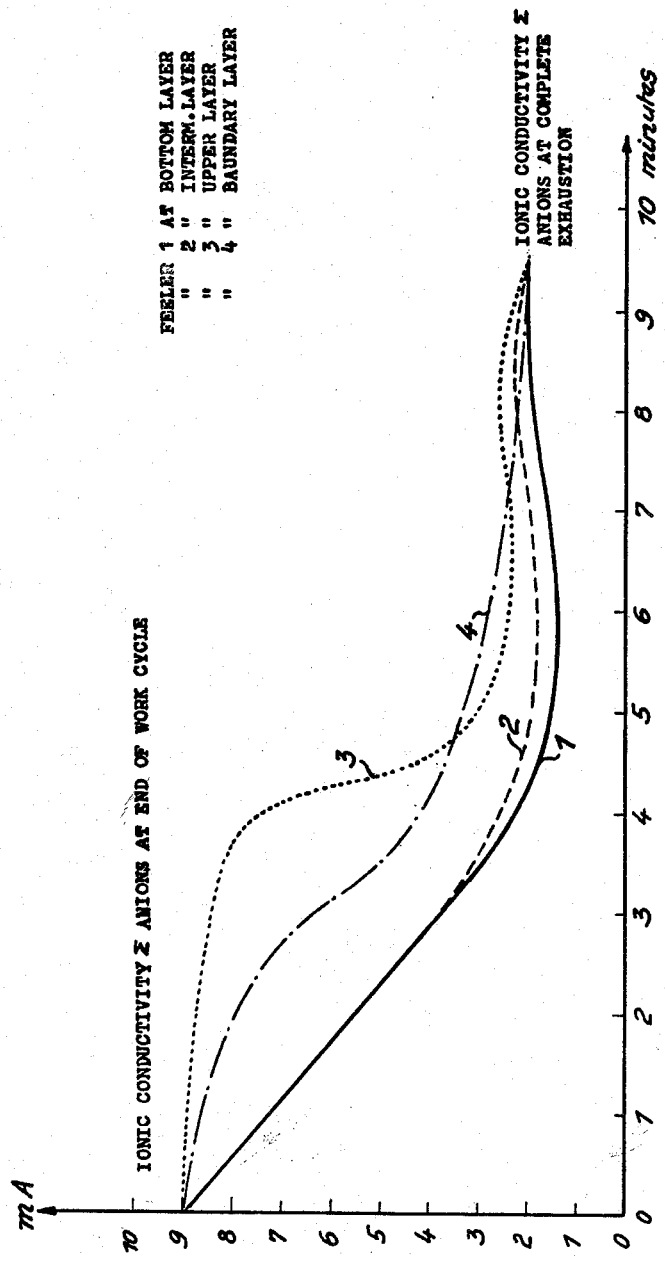

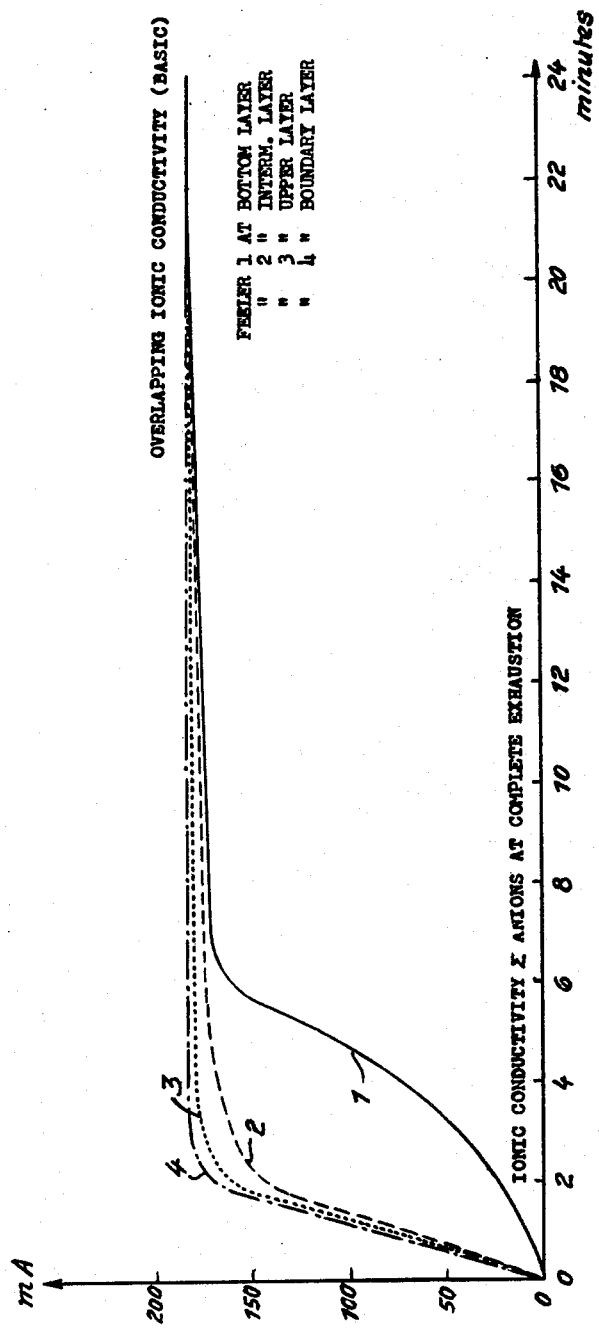

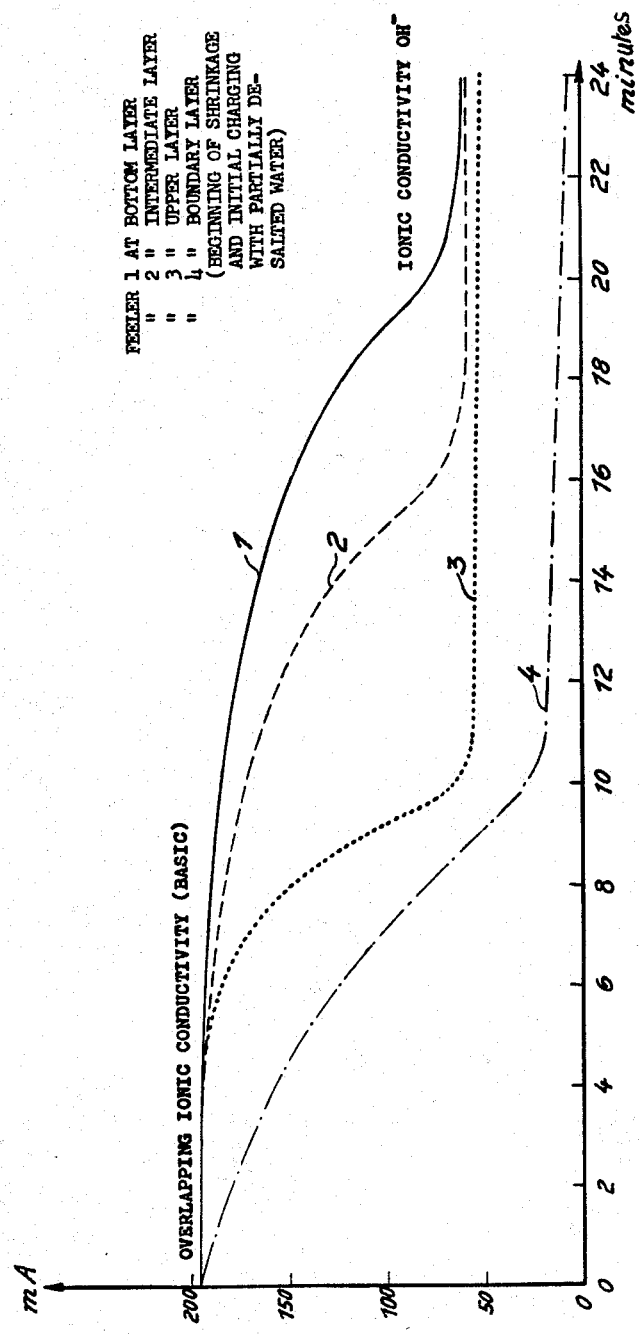

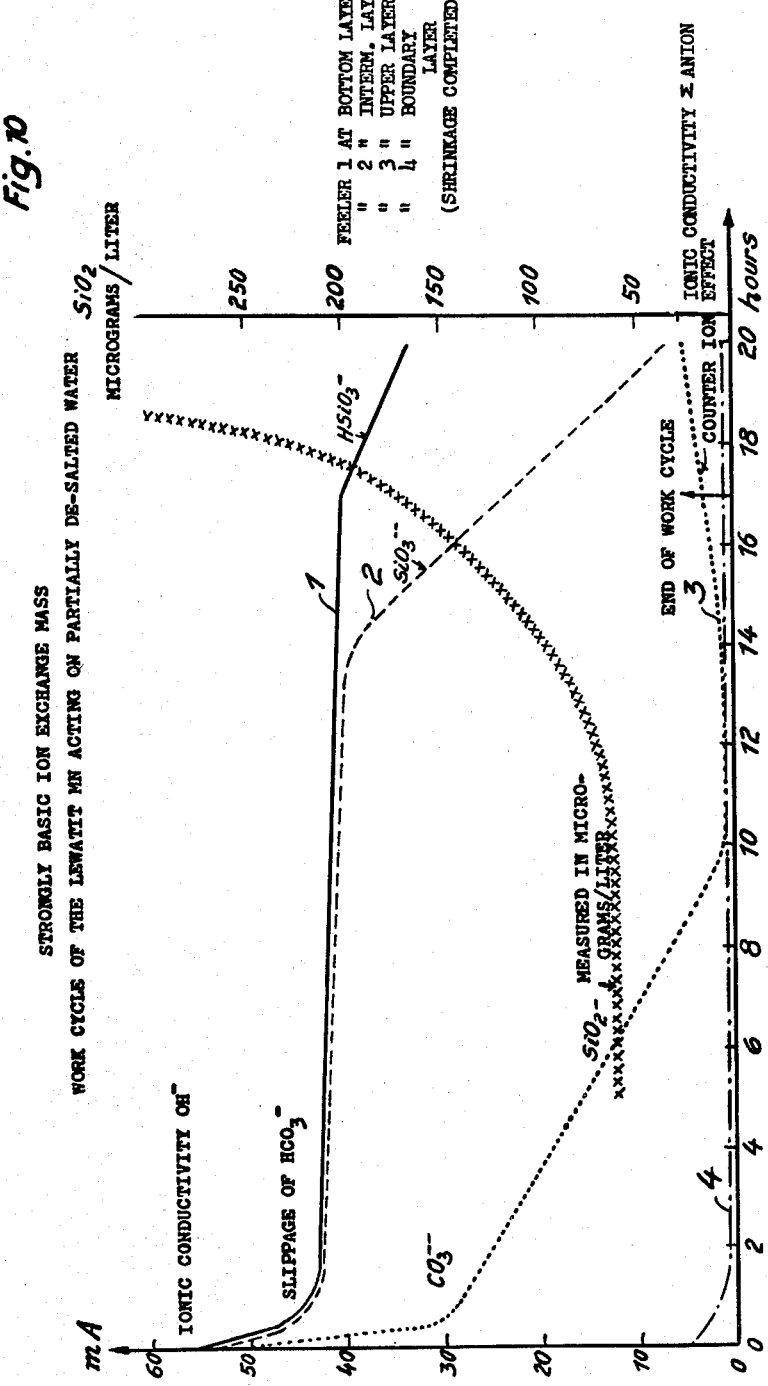

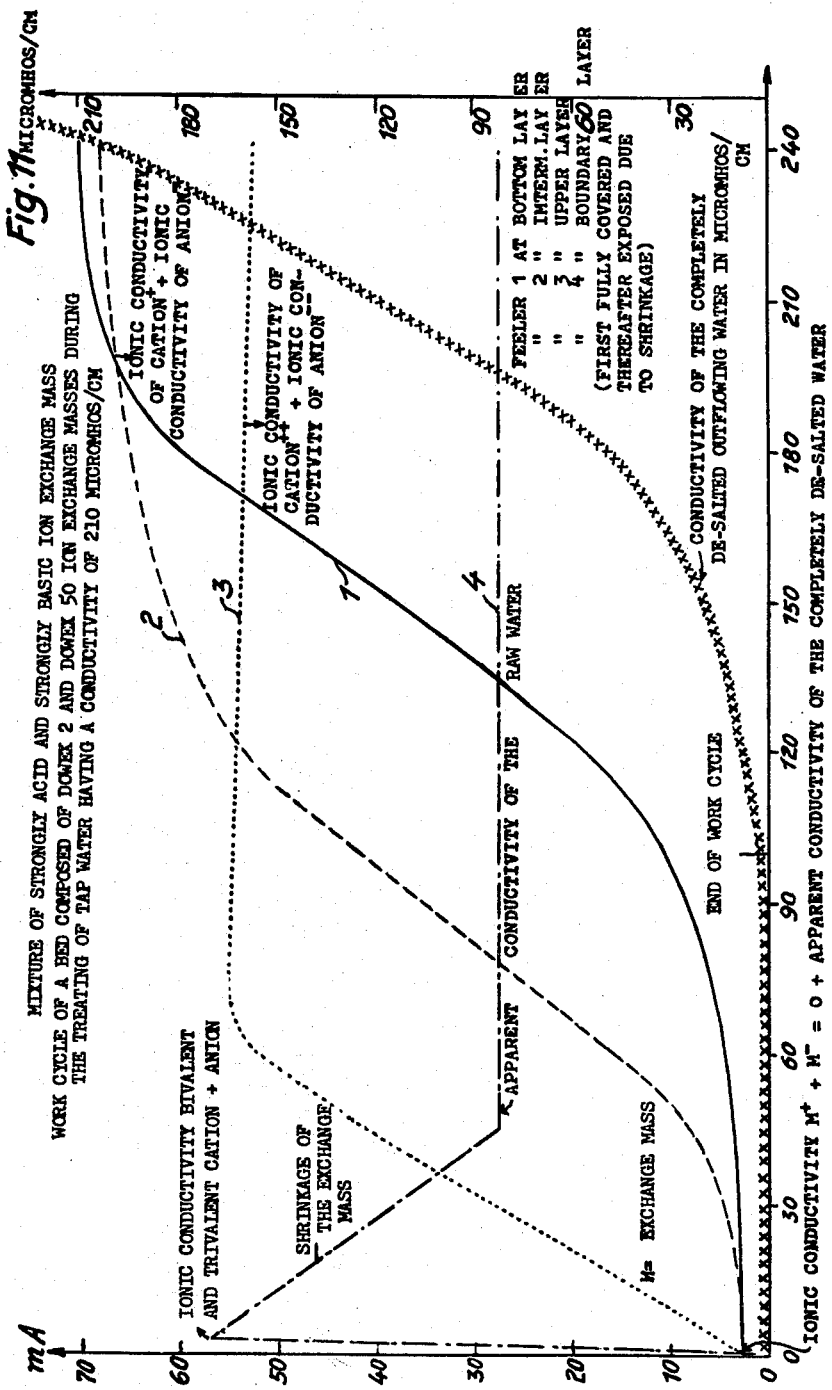

3,172,037
METHOD FOR CHECKING THE CONDITION OF AN ION EXCHANGE MASS BY SHORT INTERMITTENT APPLICATION OF DIRECT CURRENT VOLTAGE AND CURRENT MEASUREMENT
Walter Pfeiffer, Hamburg-Harburg, Germany, assignor to Bran & Lubbe, Hamburg, Germany
Filed Dec. 24, 1959, Ser. No. 861,799
Claims priority, application Germany, Jan. 2, 1959, B 51,638
7 Claims. (Cl. 324—30)

The present invention relates to a method and apparatus for checking the condition of an ion exchange mass, and is based on the surprising discovery that the electrochemical properties of an ion exchange mass is a function of the condition of the mass, i.e., the extent to which the mass is regenerated or exhausted.

In particular, it has been found that the ionic conductivity of the mass, be it an anion exchange material or a cation exchange material, varies continuously during the ion exchange process until a limit value is reached which is indicative of the exhausted or depleted state of the ion exchange mass, this ionic conductivity and thus the charge condition of the mass being determined by measuring the current, in milli-amperes, through the mass between two electrodes of predetermined size and whose spacing remains unchanged, upon the application of a predetermined voltage across the electrodes.

It has also been found that the ionic conductivity of a mass is higher if it is charged with monovalent ions than when charged with bivalent and trivalent ions. The conductivity is highest when the mass is charged with hydrogen ions or hydroxyl ions, i.e., in regenerated condition, the ionic conductivity of the mass itself being zero.

Thus, it is an object of the present invention to provide a method and apparatus based upon the discovery, which method and apparatus make it possible to obtain a precise control or check of the condition of ion exchange masses, while the masses are in use, i.e., while the ion exchange process is actually going on.

With the above object in view, the present invention resides mainly in the provision of a method of checking the condition of an ion exchange mass which comprises the step of measuring the ionic conductivity of the mass, this being effected by producing a current between at least one pair of spaced electrodes embedded in the mass and measuring the intensity of the current.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIGS. 3 to 6 are graphs representative of the results obtained according to one example of a checking method according to the present invention;

FIGS. 7 to 10 are graphs representative of the results obtained according to another example of a checking method according to the present invention; and FIG. 11 is a graph representative of the results obtained according to yet another example of a checking method according to the present invention.

Figure 1:
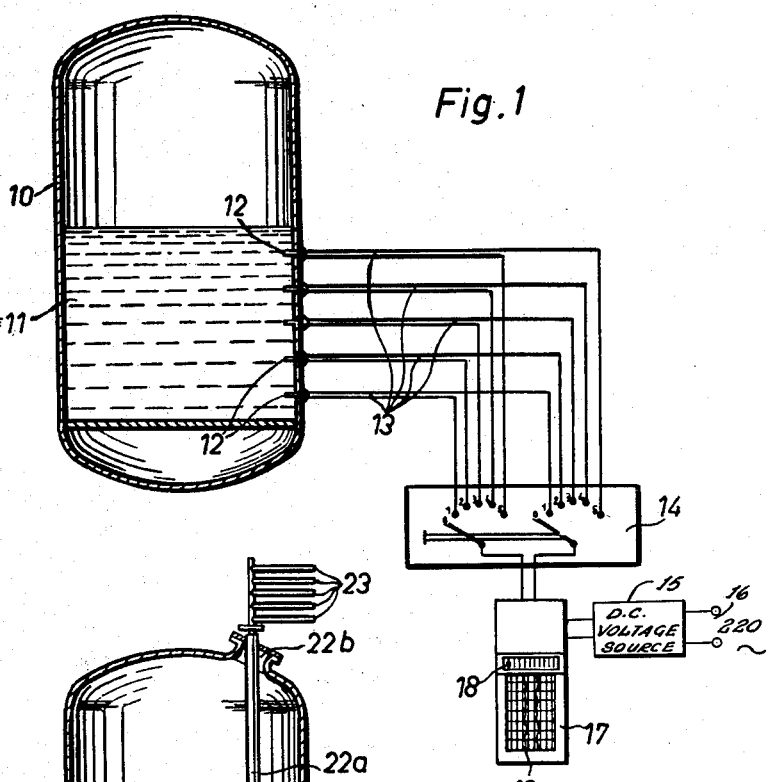
FIG. 1 is a schematic showing of an apparatus for carrying out the method of present invention.

Referring now to the drawings and to FIG. 1 thereof in particular, there is shown a conventional receptacle or tank 10 adapted to receive an ion exchange mass 11. The tank carries a plurality of pairs of electrodes 12 arranged at different levels. The electrode pairs are connected by a plurality of lines 13 to a distributor switch 14 having short contact elements, through which each electrode pair can be placed across a source of low, direct voltage source 15, powered from a conventional A.C. power source 16. The electrode pairs are also connectible to a measuring instrument 17 having an indicator 18 and a stylus for recording the current flowing through each electrode pair, when it is placed across the voltage source 15, on a continuously moving record 19.

The arrangement of the parts is such that whenever a voltage is impressed across any one electrode pair, the measuring instrument 17 will measure, in milliamperes, the current flowing through the particular electrode pair, i.e., the current that flows through the mass that is located between the two electrodes. The amplitude of the current is a function to the ionic conductivity of the mass at the particular level at which the electrode pair is arranged. Here it should be noted that the term "ionic conductivity," as used throughout the instant specification and claims, is not to be confused with the conductivity of solutions; with known conductivity measuring instruments it is not possible to detect any changes in the ion exchange mass itself.

As will be more fully appreciated upon consideration of the illustrative examples set forth below, the condition of the ion exchange mass may be determined by measuring the ion conductivity at different levels. In order not to influence the ion exchange process, this measurement, which is taken by applying a voltage across the electrodes and ascertaining the current in milliamperes, is carried out intermittently, with each application of voltage being of but short duration. It has been found that the applied voltage, which should remain constant during each measurement, can be quite low, as, for example, of the order of from approximately 1.4 to 2 volts and in any event below 10 volts. These values are below the decomposition voltage of water, so as to avoid electrolysis during the measurement.

Figure 2:
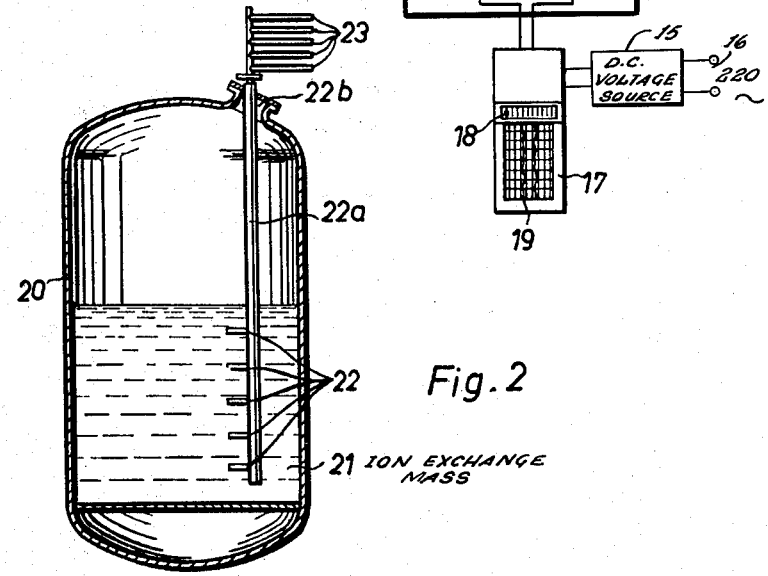
FIG. 2 is a schematic showing of a modification of the apparatus depicted in FIG. 1.

The modification shown in FIG. 2 differs from the above-described ion in that the electrode pairs 22 are not introduced laterally into the tank 20 containing the ion exchange mass 21, but are secured to a support rod 22a which is dipped into the mass 21 and projects out of the tank 20 through an upper opening 22b. Lines 23 are provided for connecting each electrode pair to a switch 14 through which the electrode pairs are connected to a power source and to a measuring instrument, as described above in connection with FIG. 1.

The present invention is further illustrated by the following illustrative examples.

*Example 1*

This and the following example are with reference to a tank having four electrode pairs, hereinafter referred to as feelers, these feelers being numbered, from the bottom to the top, as 1, 2, 3 and 4. Feeler 1 is directly above the bottom distributor, and the feelers are spaced 100 mm. from each other, with feeler 4 being partly out of the ion exchange mass. Thus, the feeler 1 is at the bottom layer, feeler 2 at an intermediate layer, feeler 3 at an upper layer, and feeler 4 at the boundary layer, this last-mentioned feeler being, at various times during the ion exchange process, either in or out of the mass due to shrinkage of the ion exchange material.

In the instant example, the ion exchange mass in the tank was Lewatit S 100, a strongly acidic material composed of small beads of a styrene polymer interlaced with divinylbenzene into which sulfonic acid groups have been introduced by consequent treatment with sulfuric acid or chlorosulfonic acid.

FIG. 3 is a graph representative of the measured values at the various feelers during the backwashing of the ion exchange mass with pure water, this backwashing being an upward flow of the water for ridding the material of mechanical impurities. It will be noted that the values measured at feelers 1, 2 and 3, at complete exhaustion of the material, attain the lower limit of the ionic conductivity, this being due to additional charging.

When the mass is regenerated with 5% hydrochloric acid, the ion conductivity as measured at all feelers, initially increases at a rapid rate, as shown in FIG. 4. Soon, however, the rise is less rapid and approaches the upper limit value where a current of 250 milliamperes flows. This value can be termed as the overlapping ionic conductivity of the regenerating acid, and, as may readily be seen from FIG. 4, the regeneration process is completed when the same ionic conductivity is indicated at all four feelers.

The regenerated mass is then subjected to an after rinse from above. As shown in FIG. 5, the ionic conductivity decreases somewhat, with the feelers 1, 2 and 3 showing the same ionic conductivity when the after rinse is completed, this last-mentioned value being termed the ionic conductivity of the hydrogen ions. At the same time, the feeler 4, which due to the commencement of the shrinkage is only partly embedded in the ion exchange mass, indicates a low value.

FIG. 6 shows the work cycle of the regenerated and rinsed ion exchange mass, while this material acts on tap water. FIG. 6 additionally shows the changes of the so-called $m$-value (the reaction of the water with a decinormal (n/10) solution of NaOH using methyl orange as indicator) of the outflowing partially de-salted water. The feelers 1, 2 and 3 show the gradual decrease of the ionic conductivity of the mass as the same is being charged during its action on the water, and the increase in the charge or the charge condition, in the direction of flow of the water being de-salted, may readily be seen at the different levels at which the feelers are arranged. At first the feeler 3, which is the topmost one of the completely embedded feelers, shows a marked decrease of the ionic conductivity of the material, and this is due to the taking on of trivalent and bivalent cations. During this process, the ionic conductivity as measured by the feelers 1 and 2 still increases somewhat, and this is due to the fact that as a result of the taking on of the cations, the carbon dioxide originally combined therewith is liberated so as to produce a certain amount of after regeneration of the mass. After about 3 hours the middle feeler 2 shows a decrease of ionic conductivity, and after an additional 3 to 4 hours the lowermost feeler 1 also shows a decrease, thereby indicating the complete exhaustion of the material. Also, it will be seen from the $m$-curve of the outflowing water that the reversing point of this curve coincides with that point of the curve of feeler 1 at which this feeler shows that the mass is completely exhausted, this being the moment at which the raw water commences to pass through the filter without being purified. As the ion exchange mass becomes exhausted, there is a slippage of ions through the mass. At first, it will be the monovalent ions that thus "slip" through the mass and will appear in the outflowing water, it being the monovalent ions that are most difficult to hold back.

*Example II*

The ion exchange mass used in this example was a strongly basic mass, namely Lewatit MN which is composed of a condensation polymer as skeleton material containing partially anchored amines as active groups.

The tank was equipped with the same four electrode pairs or feelers as mentioned in Example I, with feeler 4 again being so positioned that the degree to which it was embedded in the mass depended on the condition of the mass.

FIG. 7 shows the back washing of the spent mass with partially de-salted water. After some fluctuations, the ionic conductivity indicated by all four feelers reaches a common low value indicative of the complete exhaustion of the mass.

FIG. 8 shows the regeneration of the mass with a 5% solution of caustic soda. The ionic conductivity rises rapidly until all four feelers indicate the same upper limit, and this shows that regeneration of the mass has been completed.

The mass was then subjected to an after rinse with completely de-salted water, as shown in FIG. 9. The ionic conductivity decreases due to the elimination of all the remainder of the liquor.

The mass is now ready for use in a work cycle, and a work cycle wherein the mass acts on partially de-salted water to remove silica therefrom is shown in FIG. 10. It will be seen that the ionic conductivity at feelers 1 and 2 at first drops somewhat, this being due to the initial combining of the $HCO_3{-}{-}$ ions, after which the conductivity remains substantially constant for a considerable period of time. The moment the filtering process breaks down, i.e., as soon as the ion exchange mass becomes exhausted, the ionic conductivity drops substantially, and the silica contents of the outflowing water rises quite rapidly to high values.

*Example III*

FIG. 11 represents the ionic conductivity conditions of a mixture of strongly acid and strongly basic ion exchange masses during a work cycle involving the de-salting of water having a conductivity of 210 micromhos. The bed is a mixture of Dowex 2 and Dowex 50, Dowex 2 being composed of a strongly acidic material of a styrene polymer interlaced with divinylbenzene containing sulfonic acid as active groups and Dowex 50 being composed of a strongly basic material the skeleton of which being a styrene polymer and the active groups being dimethyl-benzyl-ethylammoniumhydroxide. By mixing the cation exchange mass having a positive hydrogen ion conductivity with the anion exchange mass having a negative hydroxyl ion conductivity, with the help of an air stream before the mass is reacted with the water, the two masses neutralize each other to form water, whereupon the ionic conductivity becomes zero. The mass thus changes from a semiconductor to an insulator.

When the purification process is commenced the unstable neutral combination of the two ion exchange masses is disrupted. Both masses are charged with anions and cations in the water. The resulting ionic conductivities of the anion exchange mass and of the cation exchange mass are cumulative and produce a total ion conductivity equal to the sum of the two conductivities. This is clearly shown in FIG. 11, from which it will also be seen, from the measurement of the conductivity of the outflowing water, that the reversing point of the curve associated with feeler 1 occurs when the exhaustion of the mass and the breakdown of the purification process takes place.

It will be seen from the above examples, that the usefulness of a mass for ion exchange purposes can be checked by determining its ionic conductivity. Thus, the present invention provides a simple way of checking the condition of an ion exchanger, which can be used to supplement existing apparatus for checking the condition of the water flowing out of the filter or purifier.

Also, thanks to the present invention the condition and properties of ion exchangers can be determined.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended

What is claimed as new and desired to be secured by Letters Patent is:

1. In an ion exchange process, the method of checking the condition of an ion exchange mass located in an ion exchange apparatus, comprising the step of measuring a low voltage direct current having a voltage below the decomposition voltage of water, and flowing intermittently for durations sufficiently short so as to be substantially without influence on the ion exchange process between spaced electrodes embedded in said mass for determining the charge condition of said mass.

2. In an ion exchange process, the method of checking the condition of an ion exchange mass located in an ion exchange apparatus, comprising the step of measuring low voltage direct currents having a voltage below the decomposition voltage of water and flowing intermittently for durations sufficiently short so as to be substantially without influence on the ion exchange process between pairs of spaced electrodes embedded in said mass at different levels thereof.

3. In an ion exchange process, the method of checking the condition of an ion exchange mass resting in an ion exchange apparatus, comprising the steps of producing low voltage direct currents having a voltage below the decomposition voltage of water and flowing intermittently for durations sufficiently short so as to be substantially without influence on the ion exchange process between pairs of spaced electrodes embedded in said mass; and measuring the current intensity of said currents.

4. In an ion exchange process, the method of checking the condition of an ion exchange mass resting in an ion exchange apparatus, comprising the steps of producing a low voltage direct current having a voltage below the decomposition voltage of water and flowing intermittently for durations sufficiently short so as to be substantially without influence on the ion exchange process between a pair of spaced electrodes embedded in said mass at one level thereof; producing a low voltage direct current having a voltage below the decomposition voltage of water and flowing intermittently for durations sufficiently short so as to be substantially without influence on the ion exchange process between at least one other pair of spaced electrodes embedded in said mass at a different level thereof; and measuring the current intensity of each of the currents.

5. In an ion exchange process, the method of checking the condition of an ion exchange mass located in an ion exchange apparatus, comprising the steps of producing a low voltage direct current having a voltage below the decomposition voltage of water and flowing intermittently for durations sufficiently short so as to be substantially without influence on the ion exchange process, between a pair of spaced electrodes embedded in said mass at one level thereof; producing a similar intermittent current of short duration between at least one other pair of spaced electrodes embedded in said mass at a different level thereof; and measuring the current intensity of each of the currents.

6. In an ion exchange process, the method of checking the condition of an ion exchange mass resting in an ion exchange apparatus, comprising the steps of applying a direct current of low, constant voltage below the decomposition voltage of water intermittently for durations sufficiently short so as to be substantially without influence on the ion exchange process across a pair of spaced electrodes embedded in said mass at one level thereof for producing a first direct current through said mass at said level thereof applying intermittently for like short durations a constant voltage below the decomposition voltage of water across at least one other pair of spaced electrodes embedded in said mass at a different level thereof for producing a second direct current through said mass at said different level thereof; and measuring the current intensity of said first and second currents.

7. In an ion exchange process, the method of checking the condition of an ion exchange mass resting in an ion exchange apparatus, comprising the steps of applying a direct current of low, constant voltage below the decomposition voltage of water intermittently for durations sufficiently short so as to be substantially without influence on the ion exchange process across a pair of spaced electrodes embedded in said mass at one level thereof for producing a first current through said mass at said level thereof, said constant voltage being of the order of approximately 2 volts similarly applying intermittently for like short durations a similar constant voltage across at least one other pair of spaced electrodes embedded in said mass at a different level thereof for producing a second direct current through said mass at said different level thereof; and measuring the current intensity of said first and second currents.

References Cited by the Examiner

UNITED STATES PATENTS

| | | | |
|---|---|---|---|
| 2,003,760 | 6/35 | Sweeney et al. | |
| 2,468,791 | 5/49 | Thomson. | |
| 2,565,501 | 8/51 | Ingram | 324—30 |
| 2,628,194 | 2/53 | Gilwood | 324—30 X |
| 2,651,751 | 9/53 | Heath | 324—30 |
| 2,774,732 | 12/56 | Blight | 324—30 X |
| 2,938,868 | 5/60 | Carlson et al. | 324—30 X |

FOREIGN PATENTS 714,642   9/54   Great Britain.

FREDERICK M. STRADER, *Primary Examiner.*
SAMUEL BERNSTEIN, *Examiner.*